April 1, 1952 — R. J. PARKER — 2,591,463
MAGNETIC TORQUE DEVICE
Filed Dec. 29, 1949

Inventor:
Rollin J. Parker,
by *Claude H. Mott*
His Attorney.

April 1, 1952     R. J. PARKER     2,591,463
MAGNETIC TORQUE DEVICE

Filed Dec. 29, 1949     2 SHEETS—SHEET 2

Inventor:
Rollin J. Parker,
by *Claude H. Mott*
His Attorney.

Patented Apr. 1, 1952

2,591,463

UNITED STATES PATENT OFFICE 2,591,463

MAGNETIC TORQUE DEVICE

Rollin J. Parker, Schenectady, N. Y., assignor to General Electric Company, a corporation of New York Application December 29, 1949, Serial No. 135,699

6 Claims. (Cl. 172—285)

My invention relates to magnetic torque devices, and more particularly to magnetic drag devices of the hysteresis or eddy current torque type useful as clutching or braking elements.

My invention is particularly applicable to braking or tensioning devices for spindles, reels or pulleys used in the textile industry or other winding and reeling application.

Devices embodying my invention may be used to apply braking torque to a spindle, reel or pulley, and thus to maintain tension on an elongated filament, such as a thread, or the like.

Hysteresis torque devices characteristically develop a substantially constant torque, and are thus particularly useful as braking or tensioning devices in winding and reeling operations. When applied to such a device, my invention provides new and novel adjusting means for selecting a desired substantially constant torque.

It is a general object of my invention to provide a simple and reliable torque device of the magnetic drag type.

It is a further object of my invention to provide a simple and reliable means for adjusting the torque of a magnetic torque device, such as a hysteresis brake or the like.

It is a particular object of my invention to provide adjustable means for determining the substantially constant torque of a hysteresis torque device.

In practicing my invention in one preferred embodiment thereof and as to applied hysteresis torque devices, I mount an annulus or ring of magnetizable material for rotation about its axis, and dispose across the ring adjacent one side thereof, a magnet having a pair of poles positioned at angularly spaced apart points on the ring and spaced therefrom by a small air gap. In order to vary the torque exerted upon the annulus as it rotates, I provide also an adjustable shunt of magnetizable material having polar portions movable simultaneously toward and away from the magnet poles, thereby to shunt more or less of the flux away from the air gap and rotatable ring. It will be understood as the description proceeds, however, that my adjustment means contemplates that the magnet may be either a permanent magnet or an electromagnet, and may be disposed around the rotor in a variety of ways. Moreover, my invention is equally applicable to eddy current torque devices in which the annulus or other secondary member cooperable with the magnet is formed of electric conducting material.

Figure 1:
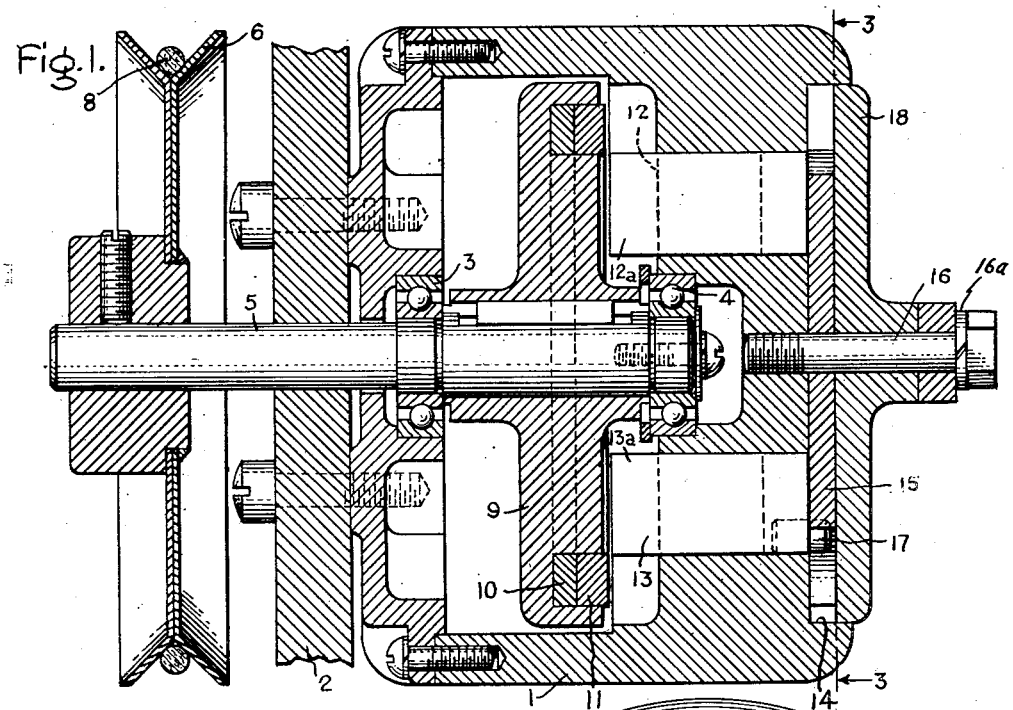
Figure 2:
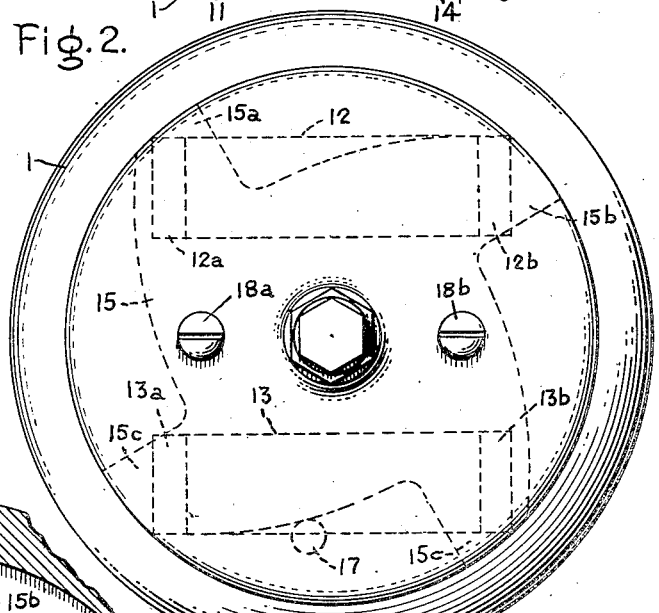
Figure 3:
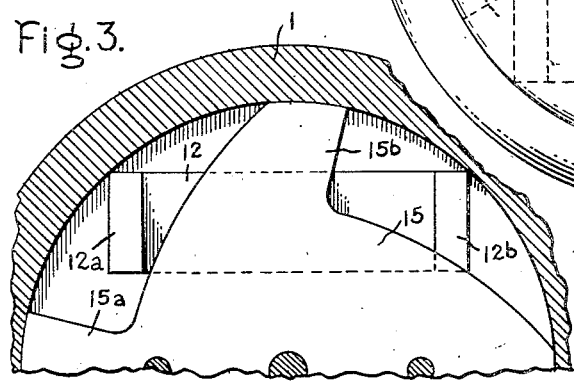
Figure 4:
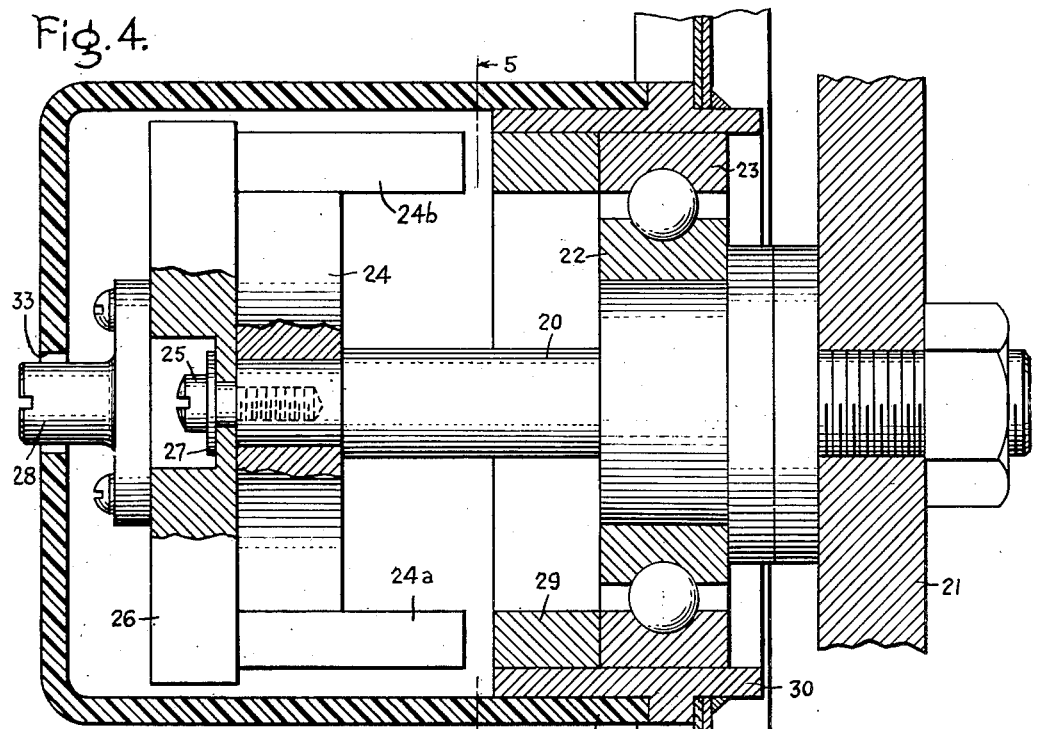
Figure 5:
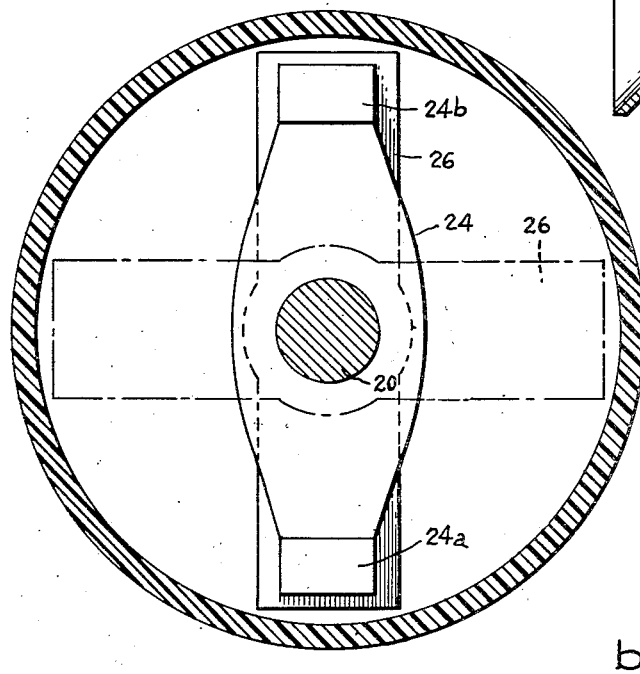

My invention will be more fully understood and its various objects and advantages further appreciated by referring now to the following detailed specification taken in conjunction with the accompanying drawing, in which Fig. 1 is an axial cross-sectional view of a hysteresis torque device embodying my invention in a preferred form; Fig. 2 is an end view of the device shown at Fig. 1; Fig. 3 is a fragmentary transverse cross-sectional view of the device shown in Fig. 1 taken along the line 3—3 of Fig. 1 looking in the direction of the arrows; Fig. 4 is an axial cross-sectional view of a hysteresis torque device embodying my invention in another form; and Fig. 5 is a transverse cross-sectional view of the device shown at Fig. 4 taken along the line 5—5 of Fig. 4 looking in the direction of the arrows.

Referring now to the drawing and particularly to Fig. 1, I have there illustrated a hysteresis torque device comprising a cylindrical housing 1 fixedly mounted upon a support 2 and having rotatably mounted therein on ball bearings 3 and 4 a rotatable shaft 5. The shaft 5 extends beyond the housing 1 at one end and carries on its extending end a pulley 6. The pulley 6 is fixed to the shaft 5 by a set screw 7 and is adapted to carry an elongated filament or thread 8. The housing 1 and shaft 5 are both formed of any suitable non-magnetizable material such as brass, aluminum or a molded plastic material.

Within the casing 1 there is fixed to the shaft 5 a disc-like rotor 9 formed of any suitable non-magnetizable material and having in one side thereof a peripheral groove within which are positioned a pair of magnetizable rings or annuli 10 and 11 disposed in flatwise face to face engagement. The ring 10 is preferably formed of soft magnetizable iron, or the like, having a relatively high permeability and low coercive force as well as low hysteresis loss characteristics. The magnetizable annulus or ring 11 is preferably formed of a high coercive force magnetizable material, such as that described and claimed in Patents 1,947,274 and 1,968,569, issued February 23 and July 31, 1934, respectively, to William E. Ruder. Such material comprises 6% to 15% aluminum, 12% to 30% nickel, about 5% copper if desired, and remainder iron, and is a high energy permanent magnet material having a large hysteresis loss characteristic.

Fixedly mounted within the casing 1 and extending in parallel spaced relation across diametrically opposite chords of the ring 11, I provide a pair of permanent bar magnets 12 and 13. At opposite ends of the magnets 12 and 13, respectively, there are disposed pairs of magnetizable pole pieces 12a, 12b and 13a, 13b extending in parallel spaced relation with the axis of the casing. The pole pieces 12a, 12b, 13a and 13b are positioned at angularly spaced apart points around the ring 11 and each is arranged with one end adjacent the rotatable magnetizable ring 11 and spaced therefrom by a small air gap. The opposite ends of the pole pieces 12a, 12b and 13a, 13b extend rearwardly toward the end of the casing 1 and are exposed in the plane of the base of a shallow circular recess 14 in the rear end of the casing. Preferably like poles of the magnets 12 and 13 are alternately disposed around the ring 11.

In order variably to shunt the flux of the magnets 12 and 13 away from the magnetizable ring 11 and the air gap and thereby to adjust the torque of the device, I position within the end recess 14 of the casing 1 and in position to engage the rearwardly extending end of the pole pieces 12a, 12b, 13a and 13b a shunting plate 15 formed of magnetizable material. The shunting plate 15 is preferably formed of a magnetizable material having high permeability and is pivotally mounted upon a bolt 16 fixed in the base 1 in axial alignment with the shaft 5. Referring more particularly to Figs. 2 and 3, it will be observed that the plate 15 is shaped to provide two pairs of salient polar portions or projections 15a, 15b, 15c and 15d. These salient polar portions are relatively angularly disposed in the same manner as the magnet pole pieces 12a, 12b, 13a and 13b, so that the polar portions of the shunt are simultaneously movable toward and away from the magnet pole pieces as the shunting plate 15 is rotated about the stud 16, thereby variably to shunt more or less of the magnet flux away from the rotatable ring 11.

Fixed in the base 1 and extending into the recess 14, I provide a stop pin 17 (Figs. 1 and 2) which limits rotational movement of the shunting plate 15. At Fig. 2 the plate 15 is shown in its maximum shunting position and at Fig. 3 the plate 15 is shown in its minimum shunting position. From Fig. 2 it will be evident that when the plate 15 is in its minimum shunting position of Fig. 3 the salient polar end 15d is in engagement with the stop pin 17. It also appears from Figs. 2 and 3 that the leading edges of the salient polar ends of the camming plate 15 are arcuate on those edges which are leading as the cam is rotated toward its maximum shunting position. This permits a smooth and gradual adjustment of the torque exerted by the magnets upon the ring 11.

The shunting plate 15 is fixed to a flat circular end plate 18 by a pair of bolts 18a, 18b. The plate 18 is formed of any suitable non-magnetizable material and is rotatably mounted upon the bolt 16 along with the shunting plate 15. The bolt 16 serves as a pivot pin for the plates 15 and 18 and holds the shunting plate 15 in position against the pole pieces 12a, 12b, 13a and 13b. A lock-washer 16a on the bolt 16 permits angular adjustment of the shunt 15 and plate 18 and frictionally holds these members in any desired angular position.

In operation, it will be evident that as the thread 8 runs over the pulley 6 the rotor 9 carrying the rings 10 and 11 is rotated in the field of the magnets 12 and 13. As the ring 11 is rotated, the magnetization of each section of the ring is repeatedly reversed by recurrent passage between the two opposite pairs of poles of the magnets. A braking force is thus applied to the rotor by reason of the hysteresis loss resulting from such repeated reversal of magnetization. The amount of said energy loss, and consequently the magnitude of the restraining force is proportional to the area of the hysteresis loop for the particular material of the ring 11. The soft iron ring 10 serves merely as a circumferential return path of low reluctance for the flux traversing the high coercive force ring 11 axially.

The magnitude of the braking or restraining force and the amount of hysteresis energy loss is proportional to the flux density in the ring 11. This flux density is controlled by the magnetic shunt 15 disposed at the opposite ends of the magnet pole pieces 12a, 12b, 13a and 13b. It will be evident that with the shunt 15 and the position shown in dotted lines at Fig. 2 the shunting effect is a maximum, so that the flux density in the ring 11 is a minimum, whereas with the shunt 15 in the position shown in Fig. 3 the shunting effect is a minimum and the flux density in the ring 11 is a maximum. Intermediate values of flux density and braking torque are obtainable by setting the plate 15 in intermediate positions. The arcuate contour of the leading edges of the projections 15a, 15b, 15c and 15d as the plate 15 is rotated from its minimum to its maximum shunting position, ensures a smooth and continuous variation in braking torque.

At Figs. 4 and 5, I have shown a somewhat simplified embodiment of my invention utilizing a single diametrically disposed permanent magnet and an elongated angularly adjustable magnetizable shunting bar. Referring more particularly to the drawing, I have there shown a non-magnetizable fixed stud 20 mounted upon a support 21 and having fixed thereto a ball bearing having an inner race 22 and an outer race 23. Fixed to the projecting end of the stud 20 and axially spaced from the ball bearing 22, 23 is a diametrically disposed permanent bar magnet 24 carrying at its ends a pair of axially disposed soft iron pole pieces 24a, 24b. Fixed in the end of the stud 20 by means of a bolt 25, I provide an elongated shunting bar 26 disposed in flat-wise engaging relation with one side of the bar magnet 24 and arranged to engage the ends of the pole pieces 24a and 24b remote from the ball bearing 22, 23. The shunting bar 26 is held in frictional clamping engagement with the magnet 24 by means of a lock washer 27 on the bolt 25, and is angularly adjustable with respect to the magnet by means of a slotted adjusting stud 28 fixed to the shunting bar.

Mounted upon the rotatable outer race 23 of the ball bearing and in flatwise engaging relation therewith, I provide an integral ring or annulus 29 formed of a high coercive force magnetizable material such as the ring 11 described in connection with Fig. 1. The ring 29 is disposed axially adjacent those ends of the magnet pole pieces 24a, 24b which are opposite the shunting bar 26, and is spaced from these pole pieces by a small air gap. Also fixed to the outer bearing race 23, I provide a mounting collar 30 formed of any suitable non-magnetizable material and carrying a pulley 31 and a cylindrical cup-shaped housing 32. The housing 32 encloses the ring 29 and magnet and shunting bar assembly, and has in its closed end a central aperture 33 through which protrudes the shunt adjusting stud 28.

It will now be evident that the device illustrated at Figs. 4, 5 operates in a manner similar to that shown in Figs. 1, 2 and 3, except that the relative rotation of parts is reversed. In the device shown in Fig. 1 the permanent magnets are stationary while the magnetizable ring 11 rotates; in the device shown in Fig. 4, the magnetizable ring 29 is stationary while the permanent magnet 24 and the connected shunt 26 rotate. In the device of Figs. 4 and 5 the outer bearing race 23 performs the function of the soft-iron ring 10 of Fig. 1, in that it serves as a low reluctance return path for flux traversing the high coercive force ring 29. It will be evident that the amount of magnetic drag or restraining force exerted upon the ring 29 by the magnet 24 may be controlled by the angular adjustment of the magnetizable shunt 26 with respect to the magnet 24. For example, at Fig. 5 the shunt 26 is shown in full lines in its maximum shunting position, and is shown in broken lines in its minimum shunting position.

It will now be evident to those skilled in the art that my invention contemplates a magnetic torque device with constant air gap and with torque adjusting means comprising circularly arranged pairs of magnet poles and a relatively angularly adjustable magnetizable shunt. The invention is thus equally applicable to hysteresis devices and to eddy current devices, and contemplates a hysteresis or eddy current ring of any convenient circular shape, such as toroidal, cylindrical, cup-shaped or the like.

While I have described certain perferred embodiments of my invention by way of illustration, many modifications will occur to those skilled in the art, and I therefore wish to have it understood that I intend in the appended claims to cover all such modifications as fall within the true spirit and scope of my invention.

What I claim is:

1. An adjustable magnetic torque device comprising a ring of magnetizable material having at least a face portion formed of high energy permanent magnet material with a large hysteresis loss characteristic, a permanent bar magnet disposed diametrically across said ring and having polar ends spaced from said ring by an air gap, means mounting said ring and magnet for relative rotation while maintaining said air gap substantially constant, and a shunting bar formed of high permeability magnetizable material and disposed to be adjustably angularly positioned with respect to said permanent bar magnet.

2. An adjustable magnetic torque device comprising a ring of magnetizable material, a magnet having a pair of opposite poles disposed adjacent angularly spaced apart points on said ring, means mounting said ring and magnet for relative rotation while maintaining a substantially constant air gap between said ring and poles, and an adjustable shunting plate of magnetizable material rotatably mounted and having a pair of salient polar portions simultaneously movable toward and away from said poles, said salient portions being provided with arcuate leading edges in the direction of movement of said portions toward said poles.

3. An adjustable magnetic torque device comprising an integral ring of magnetizable material having at least a face portion formed of high energy permanent magnet material with a large hysteresis loss characteristic, a magnet having a pair of opposite poles disposed adjacent angularly spaced apart points of said face portion, means mounting said ring and magnet for relative rotation while maintaining a substantially constant air gap between said ring and poles, an adjustable shunting plate of high permeability magnetizable material rotatably mounted and having a pair of salient polar portions simultaneously movable toward and away from said poles, said salient portions being provided with arcuate leading edges in the direction of rotation toward said poles.

4. An adjustable magnetic torque device comprising a base, an integral ring of magnetizable material mounted upon said base for rotation about its axis, a pair of permanent magnets fixed to said base and extending along chords of said ring, each said magnet having at its ends a pair of elongated pole pieces disposed in parallel spaced relation with said axis and each said pole piece having one end adjacent said ring and spaced therefrom by an air gap, said pole pieces being angularly spaced apart around said ring, and a shunting plate of magnetizable material disposed adjacent the other ends of said pole pieces and pivotally mounted for adjustment about said axis, said shunting plate having two pairs of salient polar portions simultaneously movable toward and away from said other ends of said pole pieces.

5. An adjustable magnetic torque device comprising a base, an integral circular metallic member mounted upon said base for rotation about its axis, a pair of permanent magnets fixed to said base and extending along chords of said circular member, each said magnet having at its end a pair of elongated pole pieces disposed in parallel spaced relation with said axis and each said pole piece having one end adjacent said circular member and spaced therefrom by an air gap, said pole pieces being angularly spaced apart around said ring, and a shunting plate of magnetizable material disposed adjacent the other ends of said pole pieces and pivotally mounted for adjustment about said axis, said shunting plate having two pairs of salient polar portions simultaneously movable toward and away from said other ends of said pole pieces.

6. An adjustable magnetic torque device comprising a base, an integral ring of magnetizable material mounted upon said base for rotation about its axis, said ring being formed of a high energy permanent magnet material with a large hysteresis loss characteristic, a pair of permanent magnets fixed to said base and extending along chords of said ring, each said magnet having at its ends a pair of elongated pole pieces disposed in parallel spaced relation with said axis and each said pole piece having one end adjacent said ring and spaced therefrom by an air gap, said pole pieces being angularly spaced apart around said ring, and a shunting plate formed of high permeability magnetizable material disposed adjacent the other ends of said pole pieces and pivotally mounted for angular adjustment about said axis, said shunting plate having two pairs of salient polar portions simultaneously movable toward and away from said other ends of said pole pieces and said polar portions being of arcuate configuration on the leading edges in the direction of movement toward said pole pieces.

ROLLIN J. PARKER.

REFERENCES CITED

The following references are of record in the file of this patent:

UNITED STATES PATENTS

| Number | Name | Date |
|---|---|---|
| 501,532 | Offrell | July 18, 1893 |
| 781,968 | Sachs | Feb. 7, 1905 |
| 819,933 | Schneider | May 8, 1906 |
| 1,263,694 | Meyer | Apr. 23, 1918 |
| 1,424,769 | Morrison | Aug. 8, 1922 |
| 1,531,389 | Gordon | Mar. 31, 1925 |
| 2,183,404 | Morrill | Dec. 12, 1939 |
| 2,361,239 | Ransom | Oct. 24, 1944 |
| 2,442,016 | Poole | May 25, 1948 |
| 2,460,921 | Candy | Feb. 8, 1949 |

FOREIGN PATENTS

| Number | Country | Date |
|---|---|---|
| 9,437 | Great Britain | Of 1899 |
| 562,622 | Great Britain | July 10, 1944 |